United States Patent Office 3,076,632
Patented Feb. 5, 1963

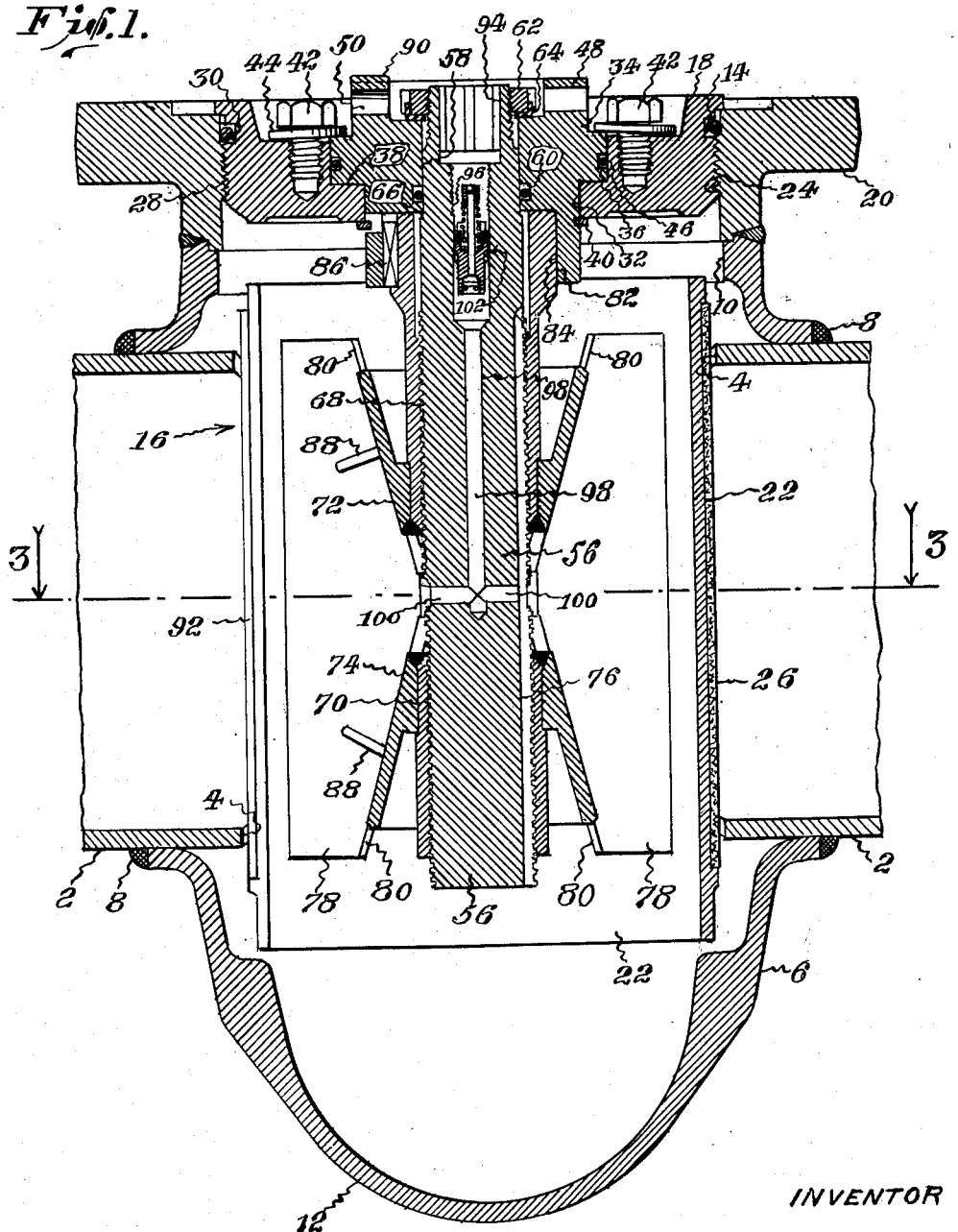

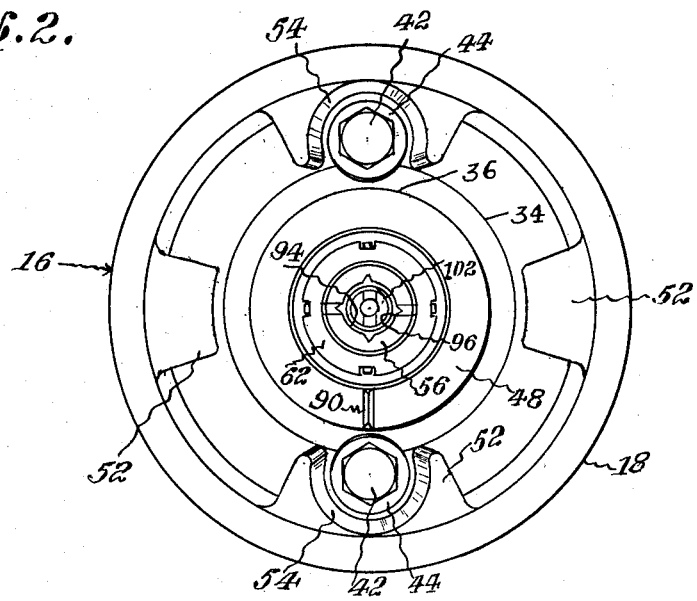
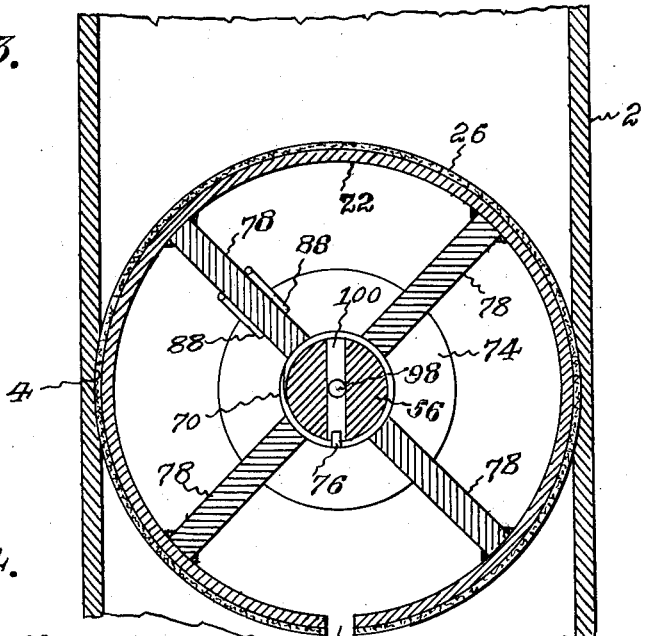
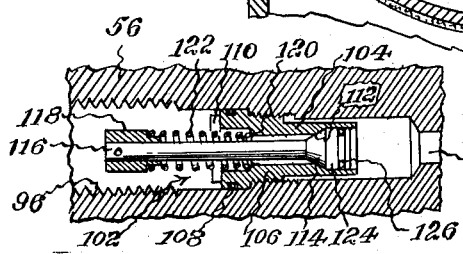

3,076,632
PIPE LINE STOPPER
John J. Smith, Decatur, Ill., assignor to Mueller Co., Decatur, Ill., a corporation of Illinois
Filed May 14, 1959, Ser. No. 813,185
7 Claims. (Cl. 251—187)

This invention relates to a pipe line stopper of the expansible plug type which is adapted to be inserted into a transverse opening in a pipe line and expanded to shut off flow of fluid therethrough. More particularly, this invention pertains to improvements in stoppers of the split sleeve type, exemplified by the disclosures of the Patents to Smith 2,655,339 and Koenig 2,740,606.

Split-sleeve stoppers of the type shown in the aforementioned patents have proven to be extremely effective in actual practice. Stoppers of that type in use at the present time, however, require the use of an inserting or stopping machine, including the usual gate valve, stopper bell, and other appurtenances as shown in the above-mentioned patents, during the entire time that the stopper is effecting a shut-off. Frequently a shut-off must be maintained for a protracted period of time. An inserting machine is an expensive piece of equipment, so that if it could be removed, for use elsewhere while a protracted shut-off is maintained, and then returned to discontinue the shut-off, the resulting savings would be considerable.

Consequently, it is an object of this invention to provide a pipe stopper assembly of the split-sleeve type that can be employed with a conventional stopper fitting on a line to effect a shut-off, while permitting the stopping machine to be removed and replaced without escape of fluid from the line.

Another object of this invention is to provide a split-sleeve pipe stopper assembly which includes a closure for the usual opening in a conventional stopper fitting in order to enable an inserting machine to be removed from and replaced on the fitting without escape of fluid therefrom.

Another object of this invention is to provide a split-sleeve pipe stopper of the type described with a closure for a stopper fitting and with means for expanding and contracting the stopper while the closure is attached to the fitting.

Another object of this invention is to provide a pipe stopper assembly of the type described with index means to facilitate orienting the stopper in the transverse opening in the line.

A further object of this invention is to provide the fitting closure with valve means for automatically equalizing the pressure on opposite sides of the closure in order to facilitate attachment and detachment thereof to and from the fitting.

Other objects and advantages of the invention will be evident from the following description and the accompanying drawings, in which:

FIGURE 1 is a sectional view showing a pipe stopper assembly embodying this invention effecting a shut-off in a pipe line with the inserting machine removed therefrom.

FIGURE 2 is a plan view of the stopper assembly shown in FIGURE 1.

FIGURE 3 is a sectional view taken on the line 3—3 of FIGURE 1; and

FIGURE 4 is an enlarged fragmentary sectional view of the equalizing valve shown in FIGURE 1.

Referring now to the drawings there is shown a section of a pipe line 2 having a transverse circular opening 4 extending therethrough and enclosed within a conventional stopper fitting 6 secured about the line as by welds 8, or any other suitable means. The fitting 6 has a closed end 12 and an open end 10, the latter being provided with an exterior annular bolting flange 20, interior threads 24, and outwardly beyond the threads with a smooth-walled interior cylindrical section 14.

A stopper assembly 16, embodying this invention for use with the fitting 6 includes a plug-like closure 18 for the fitting and a cylindrical split stopper sleeve 22 of spring steel or the like, carried by the closure. The sleeve 22 is receivable within the opening 4 in the line 2 and is of slightly smaller diameter, when relaxed, than such opening. Preferably the outer surface of the sleeve 22 is provided with a covering of suitable gasket material 26 for sealing engagement with the edges of the opening 4 in the line, as shown in FIGURE 3 when the sleeve is expanded as later described. The closure 18 has exterior threads 28 engageable with the interior threads 24 in the fitting open end 10. Carried in a circumferential groove in the closure 18 outwardly beyond its threads 28 is an O-ring 30 adapted to sealingly engage with the smooth-walled section 14 in the fitting open end.

Swivelly mounted in a central opening 32 in the closure 18 is a stopper-orienting member 34 that is retained in place by an outer circumferential flange 36 thereon seating against an outwardly facing shoulder 38 in the opening 32 and by a snap-ring 40 disposed in a groove in the inner end of the member 34 and bearing against the inner side of the closure 18. The member 34 may be restrained from rotation relative to the closure 18 by screws 42 threaded into the outer side of the closure and each carrying a washer 44 one side of which overlaps the flange 36 on the member 34. The joint between the member 34 and the closure 18 is sealed, preferably by an O-ring 46. The outer end of the member 34 is provided with an upstanding annular skirt 48 having radial openings 50 therethrough for engagement by a spanner wrench, or the like (not shown), to rotate the member relative to the closure 18 when the screws 42 are released.

The outer face of the closure 18 is somewhat dished with projections 52 extending radially inwardly from the side wall or rim for engagement by a suitable wrench (not shown) to screw the closure into the fitting open end 10. Certain of the projections 52 may be recessed, as at 54, for protective reception of the washers 44 and the heads of the screws 42.

The expanding mechanism for the stopper sleeve 22 includes a jack screw 56 coaxially swivelly mounted in a central bore 58 in the member and sealed thereto by an O-ring 60. The screw 56 is retained in place by a nut 62 threaded onto its outer end and locked thereon by a lock washer 64 and by an outwardly facing shoulder 66 on the screw bearing against the inner side of the member 34. The screw 56 has two threaded portions 68 and 70, one having a right hand thread and the other a left hand thread, on which are mounted conical wedge nuts 72 and 74, respectively. Preferably, both threads 68 and 70 have a longitudinal cleaning groove 76. The inner side of the stopper sleeve 22 has secured thereto, as by welding, a plurality of thin radial vanes 78 having inclined inner edge portions 80 complementary to the outer conical surfaces of the wedge nuts 72 and 74. Consequently, when the wedge nuts are moved toward each other, on rotation of the screw 56 in one direction, an expansive wedging action occurs which expands the sleeve 22 into sealing engagement with the edges of the opening 4 in the pipe 2.

The upper wedge nut 72 is provided with a tubular extension 82 which fits within a counterbore 84 in the inner side of the member 34. The extension 82, and consequently the nut 72, is restrained against rotation relative to the member 34 by a key 86 which allows limited longitudinal movement of the extension relative to the member 34. Such longitudinal movement is necessary because the wedge nut 72 must move up and down on the jack screw 56. Relative rotation between the wedge nuts 72 and 74, and between the nuts and the stopper sleeve 22, is prevented by a pair of spaced radially extending pins 88 on each nut which straddle one of the vanes 78.

As best shown in FIGURE 2, the outer side of the member 34 is provided with an index mark in the form of a ridge 90 aligned longitudinally with the split 92 in the sleeve 22 to aid in orienting the latter so that the split will be on the upstream side of the line in a shut-off in order that line pressure can assist in expansion of the sleeve. The outer end of the jack screw 56 is provided with a noncircular socket 94 for the reception of an appropriate wrench (not shown) in order to rotate the screw to expand the stopper sleeve 22 or permit it to contract. Extending inwardly from the bottom of the socket 94 is an interiorly threaded recess 96 for the reception of a threaded portion on an inserting tool (not shown) for retaining the entire closure and stopper assembly 16 on the tool during inserting and removing operations by an inserting machine (not shown) adapted to be bolted to the fitting flange 20. The tool also is provided with a wrench portion for engagement with the projections 52 on the closure 18 in order to rotate the latter.

Communicating with the recess 96 is a longitudinal duct 98 in the screw 56 that terminates, at its inner end, in radial ducts 100 which communicate with the interior of the sleeve 22 between the wedge nuts 72 and 74. As best shown in FIGURE 4, the outer end of the longitudinal duct 98 is enlarged to receive a normally-closed spring-pressed valve assembly 102 which includes an exteriorly threaded sleeve 104 engaged with threads 106 in the enlarged portion of the duct 98 and sealed thereto by an O-ring 108 carried by the sleeve and engaging a smooth-walled section of the duct outwardly of the threads 106. The outer end of the sleeve 104 is provided with a kerf 110 for receiving an appropriate tool (not shown) for screwing the assembly 102 in place. A tapered valve seat 112 is formed at the inner end of the sleeve 104 and is engaged by a valve member or head 114 provided with a stem 116 that extends upwardly through the sleeve into the recess 96. Confined between an abutment sleeve 118 on the outer end of the stem 116 and a shoulder 120 formed in the sleeve 104 is a coil compression spring 122 which normally holds the valve 106 firmly on its seat 112. In order to increase the sealing action of the valve, the valve member 106 may be provided with a cylindrical section 124 carrying an O-ring 126 which sealingly engages an inner cylindrical section of the sleeve 104 inwardly of the valve seat 112.

In order to effect a shut-off, the closure and stopper assembly 16 is attached to an inserting tool (not shown), the threaded retaining portion (previously referred to) of which engages with the threads in the recess 96 and pushes the stem of the valve 114 inwardly to open the latter. In this connection, such threaded portion of the tool (not shown) obviously should be longitudinally grooved or otherwise provided with a duct so as to not block communication between the duct 98 and the non-circular socket 94 in the outer end of the jack screw 56 when the valve 102 is open. Before the tool is attached, the jack screw 56 is rotated in a direction to permit contraction of the stopper sleeve 22. With the use of an inserting machine, the assembly is inserted into the fitting 6 and the closure 18 rotated to screw it into the open end 10 of the fitting. Because the valve assembly 102 is open during this operation, the pressure is equalized on opposite sides of the closure 18, thus avoiding the difficulty attendant screwing the closure into the fitting 6 against pressure.

After the closure 18 has been screwed in sufficiently for the O-ring 30 to seal with the fitting 6, the threaded portion of the inserting tool can be unscrewed from the jack screw 56, thus permitting the valve 102 to close. The tool, together with the machine can then be removed from the fitting 6, so that the closure 18 can be tightened into the fitting by a wrench engaged with the projections 52 on the closure. After the closure 18 is tightened into place, the screws 42 are loosened so that a spanner may be engaged with the radial holes 50 in the member 34 and the latter rotated to properly orient the stopper sleeve 22 within the circular opening 4 in the line 2, which orientation will be indicated by the index mark or ridge 90. Usually, the stopper sleeve 22 will be oriented, as aforedescribed, so that the split 92 therein will be on the upstream side of the line 2.

After the stopper sleeve 22 has been properly oriented, the screws 42 are retightened. A wrench then is engaged within the non-circular socket 94 in the outer end of the jack screw 56 and the latter rotated in a direction to effect movement of the wedge nuts 72 and 74 toward each other to thereby expand the stopper sleeve 22 into tight sealing engagement with the edges of the circular opening 4 through the pipe line 2 to thus shut off flow therethrough. If the shut-off is to be maintained for any appreciable period of time, a closure cap (not shown) can be secured to the flange 20 of the fitting 6 to protect the closure and stopper assembly 16 from dirt, weather, and the like.

When it is desired to discontinue the shut-off, the jack screw 56 is rotated, by an appropriate wrench engaged within the socket 94, in a direction to move the wedge nuts 72 and 74 away from each other and thus permit the stopper sleeve 22 to contract out of sealing engagement with the edges of the opening 4 in the pipe 2. Thereupon, the inserting tool and the inserting machine are reattached to the closure and stopper assembly 16 and to the fitting flange 20, respectively. In this connection, it will be realized that the arrangement is such that the valve 102 will not be opened by the inserting tool until after the inserting machine has been attached to the fitting 6. Thereafter, the closure 18 is unscrewed from the fitting 6 and the assembly 16 moved up into the inserting machine. By further use of the machine in a known manner a conventional threaded closure plug (not shown) is screwed into the open end 10 of the fitting 6 and the latter thereafter provided with a closure cap (not shown).

It thus will be seen that the objects of this invention have been fully and effectively accomplished. It will be realized, however, that the foregoing specific embodiments have been shown and described only for the purpose of illustrating the principles of this invention and is subject to extensive change without departure from such principles. Therefore, this invention includes all modifications encompassed within the spirit and scope of the following claims.

I claim:

1. A pipe stopper assembly for use with a stopper fitting secured to a pipe line and enclosing, and having an open end aligned with, a transverse circular opening through the line, said assembly being adapted to be installed to block off flow through the line, without escape of fluid to the atmosphere, by means of an inserting machine detachably securable to the fitting, said assembly comprising: a closure for and having a portion insertable in the open end of the fitting; means carried by said portion for detachably securing said closure to the fitting; a split cylindrical stopper sleeve carried by said closure against axial movement relative thereto, said sleeve being adapted to extend through the line opening when said closure is attached to the fitting; means within said sleeve for expanding the same so that it can move into flow-stopping sealing engagement with the edges of the line opening; rotatable means carried by said closure, accessible from the outer side thereof, and extending within said sleeve for operating said expanding means; means defining a passage through said closure to provide communication between opposite sides thereof; and normally-closed valve means controlling said passage and having a stem portion engageable by an inserting tool for opening said valve means and maintaining it open during an operation of inserting said closure portion in the fitting open end and securing said closure to the fitting.

2. A pipe stopper assembly for use with a stopper fitting secured to a pipe line and enclosing, and having an interiorly-threaded circular open end aligned with, a transverse circular opening through the line, said assembly being adapted to be installed to block off flow through the line, without escape of fluid to the atmosphere, by an inserting machine detachably securable to the fitting, said assembly comprising: an exteriorly threaded closure for and adapted to be screwed into the open end of the fitting; a jack screw, having two sets of threads of opposite pitch, projecting from the inner side of said closure and having a shank portion swivelly connected thereto and accessible from the outer side thereof; a pair of nuts on said screw, one engaged with each thread set, for movement selectively toward or away from each other along said screw on rotation of the latter; a split cylindrical stopper sleeve coaxially enclosing said nuts and adapted to extend through the line opening when said closure is screwed into the fitting open end; expanding means within and engaged with said sleeve and operable by movement of said nuts to expand said sleeve so that it can move into flow-stopping sealing engagement with the edges of the opening in the line; and means operatively connecting said nuts to said closure against relative rotation but for relative axial movement therebetween.

3. The structure defined in claim 2 including a sealing ring carried by the periphery of the closure for sealing engagement with an opposed surface within the fitting open end.

4. The structure defined in claim 2 including means defining a passage through said closure to provide communication between opposite sides thereof and normally-closed valve means controlling said passage and having a stem portion engageable by an inserting tool for opening said valve means and maintaining it open during an operation of inserting said closure in the fitting open end and attaching said closure to the fitting.

5. The structure defined in claim 2 including a sleeve-orienting member swivelly connected to the closure coaxially with the jack screw and swivelly carrying the latter, the connecting means including said member, and means engaged with said member and closure for releasably restraining relative rotation therebetween.

6. The structure defined in claim 2 in which the expanding means comprises means defining inclined complementary opposed wedging faces carried by the nuts and the sleeve, and the connecting means includes means engaged with one of said nuts and said closure for restraining relative rotational movement while permitting relative longitudinal movement therebetween and means engaged with said sleeve and each of said nuts for restraining relative rotational movement while permitting relative longitudinal movement between said sleeve and each of said nuts.

7. The structure defined in claim 6 wherein the connecting means includes a sleeve-orienting member swivelly connected to said plug coaxially with the jack screw, swivelly carrying the latter, and being engaged by the means engaged with the said one nut, and further includes means engaged with said member and closure for releasably restraining relative movement therebetween.

References Cited in the file of this patent

UNITED STATES PATENTS

| | | |
|---|---|---|
| 1,911,708 | Mueller | May 30, 1933 |
| 1,916,632 | Mueller | July 4, 1933 |
| 2,346,052 | Seamark | Apr. 4, 1944 |
| 2,585,290 | Walker | Feb. 12, 1952 |
| 2,655,339 | Smith | Oct. 13, 1953 |
| 2,696,966 | Mueller | Dec. 14, 1954 |
| 2,866,213 | McArthur | Dec. 30, 1958 |